United States Patent [19]

Niquette

[11] 4,173,082
[45] Nov. 6, 1979

[54] PAPER FOR TEACHING WRITING SKILLS

[76] Inventor: Joan Niquette, 321 Jelliff Mill Rd., New Canaan, Conn. 06840

[21] Appl. No.: 726,586

[22] Filed: Sep. 27, 1976

[51] Int. Cl.² ............................................. G09B 11/04
[52] U.S. Cl. .......................................... 35/37; 283/45
[58] Field of Search ........................ 35/36, 37; 283/45

[56] References Cited

U.S. PATENT DOCUMENTS

| Re. 14,488 | 6/1918 | Davis | 283/45 |
|---|---|---|---|
| 819,877 | 5/1906 | Gilman | 283/45 |
| 1,211,297 | 1/1917 | Davis | 283/45 |
| 1,227,653 | 5/1917 | Pennewill | 283/66 R |
| 1,253,758 | 1/1918 | Wilkes | 35/37 |
| 3,638,332 | 2/1972 | Jones | 35/37 |

Primary Examiner—William H. Grieb
Attorney, Agent, or Firm—Allen D. Brufsky

[57] ABSTRACT

Paper containing three module staffs of contiguous, distinctly shaded bands of equal width are printed with non-photographically reproducible ink on a planar sheet. The bands of each module are spaced from a similar module by a band of non-color and an uncolored area is provided about the periphery of the sheet. Letters are printed or written commencing in the space of the middle one of shaded bands of each module to teach writing in an area rather than on a line. The ascending and descending portions of the letters are formed on the upper and lower bands to teach proper proportioning of the letters and the words formed on any one staff are spaced from words on an adjacent staff and the periphery of the paper by the non-colored areas to stimulate proper spacing and margination. Because of the non-photographically reproducible ink used to form the bands, the paper may be photographically reproduced and the writing compared with that on unlined paper to determine the progress of a student.

7 Claims, 2 Drawing Figures

PAPER FOR TEACHING WRITING SKILLS

BACKGROUND OF THE INVENTION

1. Field of the Invention

This invention relates to paper designed as an aid for teaching writing skills.

2. Description of the Prior Art

Paper for teaching writing skills consists generally of sheets of paper printed with horizontal parallel guide lines providing spaces in which to write. A pair of such parallel lines is usually divided into two equal parts by horizontal dash lines which guide a child in the proper formation of capital and lower case letters.

Other aids which have been used consist of templates on which a piece of transparent paper is placed. The template serves as a guide for forming lower case letters and the ascending and descending portions of such letters and capitals are formed above and below a cut out portion of the template. The template merely guides the correct height of the letters. Such a penmanship template is disclosed in U.S. Pat. No. 1,253,758 issued to H. D. Wilkes on Jan. 15, 1918. A similar guide positioned beneath a piece of writing paper is shown in U.S. Pat. No. 1,211,297 issued to G. E. Davis on Jan. 2, 1917.

Of more recent vintage is writing paper disclosed in U.S. Pat. No. 3,638,332 issued to A. M. Jones on Feb. 1, 1972. In this patent, a two module staff is provided consisting of spaced parallel lines. On top of the first line of the staff is a green band and below the last line of the staff is a red band. The parallel lines are spaced by a dotted yellow line. Each of the two module staff just described is spaced from a similar staff by a band of blue color. The green band stands for "go" and tells a child where to begin writing or forming a letter such as an upper case capital letter. The red or bottom band indicates that the child should "stop" formation of a letter at this bottom line. The descending portions of lower case letters, however, are written in the blue band and lower case letters are started at the dotted yellow line. Accordingly, this type of writing paper is simply a newer version of the older two parallel line staff divided by a dotted line for signaling where to start writing upper and lower case letters.

All of the aforementioned teaching aids suffer from the same disability, that is, they deal with paper for teaching writing skills which use lines to write upon or have lines which serve as guides between which letters are formed. In later life, such paper is quite different from unruled and unlined paper on which adults normally write upon or at the very least, when lined paper is used, the letters are formed between a pair of such lines forming a one-staff writing space, rather than a two-staff writing space. Accordingly, as writing skill progresses, the learner must adjust from writing upon lined paper to unlined paper which requires that new ways of skipping lines must be learned, proper margination must be employed, etc.

Further, lines serve as inhibitors to the learning process rather than as an aid. A line is a space divider on which the correct formation of a letter is to be completed; yet, certain letters require that a student cross that line in the proper formation of the letter, such as those letters containing ascending and descending portions as "y," "p," and "d." When the line is crossed, collisions occur. Otherwise, a student must skip lines, and in this event, half the paper is wasted. Further, in order to write between lines, the student must physically strain to reach the proper line and not cross it, and confine his writing between the lines. In writing on unlined paper as a student progresses with his skills, he is therefore asked to visualize such lines. This is an abstraction and places value on form rather than substance of the writing.

Accordingly, the writing paper of the present invention utilizes a completely different concept to teach the correct formation of letters. No lines are provided on the paper, but rather, different shaded areas or bands of different colors are provided in a three staff module, with proper margination and spaces between the three staff modules to teach the formation of letters on an area rather than abutting any particular line.

SUMMARY OF THE INVENTION

In accordance with the present invention, a writing paper is provided which is printed with bands, rather than lines, of different shades of color. A preferred color is non-photographically reproducible blue. The object is to have the student fill up the colored areas with writing. Therefore, the eyes of the student are trained to fill up an area rather than imagine a line on which to write.

The bands of color are arranged in a staff of three modules: one for the upper zone of a letter, such as the ascending portion of the letter "d", one for the middle zone of a lower case letter such as an "n", and one for the lower zone of a descending portion of a letter such as found in the letters "y" or "p." In this way, any word may be written without colliding with any other word on an area above or below it. Proper spacing between the lines of writing is structured by leaving a one module band of non-color alternating with each three modular area of colored bands. Thus, the student conceptionally need not strive to "skip lines," but rather is once again dealing with a space between lines of writing which his eye is trained to perceive.

Margination is accounted for by the absence of color or a non-color area around the entire perimeter of the printed sheet of writing paper.

BRIEF DESCRIPTION OF THE DRAWING

Further objects and advantages of the present invention will become apparent from the following description and claims, and from the accompanying drawing wherein:

DETAILED DESCRIPTION OF THE PREFERRED EMBODIMENT

Figure 1:
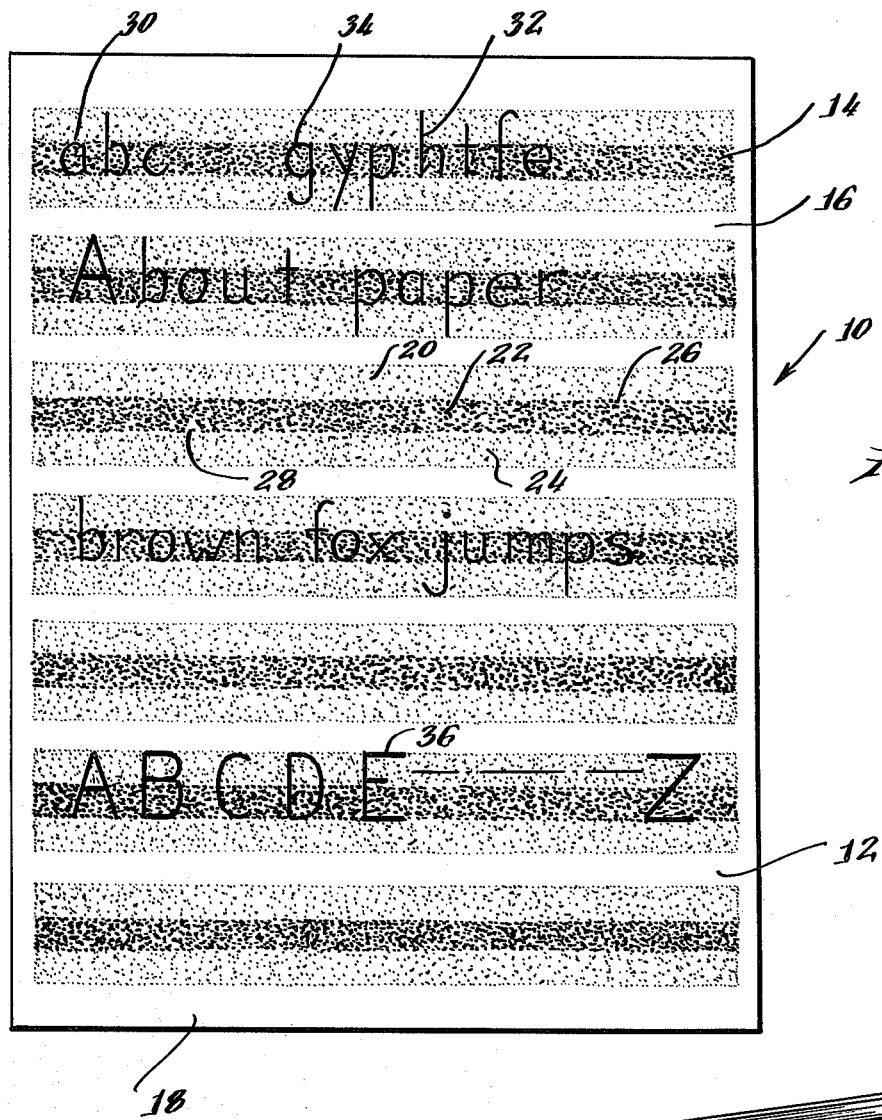
FIG. 1 is a front view in elevation of a sheet of the writing paper of the present invention.

Referring now to the drawing in detail, wherein like numerals indicate like elements throughout the several views, the writing paper 10 of the present invention includes a substantially rectangular planar sheet 12 provided with a three-module colored area 14 spaced by bands 16 of non-colored areas. Further, the paper includes an uncolored area 18 extending completely around the perimeter of the sheet 12.

Each three module colored area 14 consists of contiguous bands of different shades of the same color. For example, band 14 may consist of an upper zone 20 and a lower zone 24 of approximately the same width joined to a middle zone 22 along interfaces 26 and 28, respectively. Middle zone 22 is also substantially the same width as zones 20 and 24. Zones 20 and 24 may be shaded a light non-photographically reproducible blue while middle zone 22 may be shaded a darker non-photographically reproducible blue so as to differentiate zone 22 from zones 20 and 24 in area 14.

By providing a three module staff of different shaded contiguous bands in each area 14, a lower case letter such as an "a" 30 may be written in the darkest band comprising the middle zone 22 of each area 14. Lower case letters such as an "h" 32 having an ascending or upper portion may be written in contiguous zones 20 and 22, while a lower case letter such as a "g" 34 having a descending portion may be written between zones 22 and 24. The ascending and descending portions of letters such as 32 and 34 are spaced from adjacent words by a non-color band 16. Capital letters such as "E" 36 may be formed between zones 20 and 22. By use of the different zones, a word may be written without colliding with any other word on a line of writing above or below it.

Margination is taught by providing the non-color perimeter 18 around sheet 12. Since the student is writing upon colored areas, the margin 18 develops itself as the page fills up, teaching the student's eyes to leave a space between the edges of the page and the commencement of his writing.

As discussed above, the colored areas 14 are non-reproducible, which discourages piracy of the design of the paper by photocopiers and the like. Of greater importance, the non-photographically reproducible ink used to form the bands 20, 22 and 24 permits photocopies of the paper to be made as camera-ready originals for further reproduction without showing any areas to detract from the writing itself. This can then be compared with writing practiced on completely blank paper to determine progress of the student.

Figure 2:
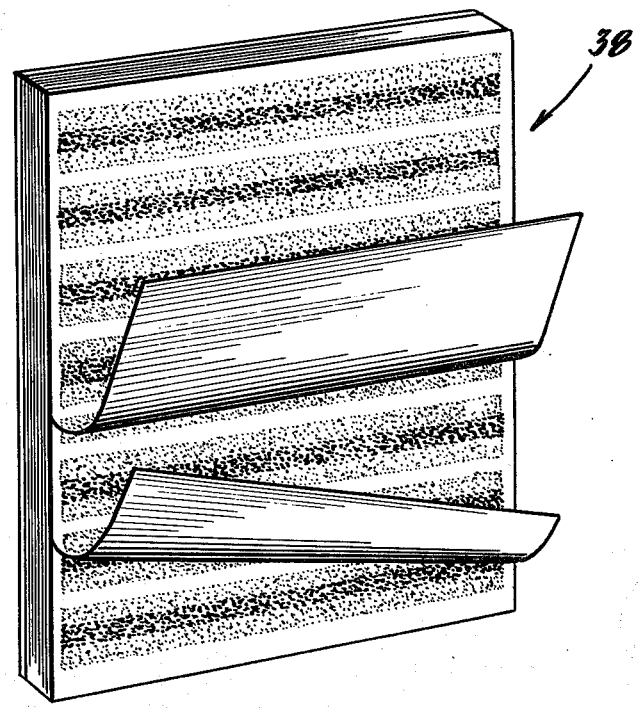
FIG. 2 is a perspective view of a tablet containing a plurality of sheets of paper illustrated in FIG. 1.

As shown in FIG. 2, non-colored portions of the margin 18 are adhesively secured together to form a tablet 38. Moreover, the concept described above can be used on any writing surface such as a blackboard, sand table, fabric, etc. where these surfaces allow for the application of a shaded or even stippled area to provide a three module staff.

What is claimed as new is:

1. A writing surface for use as an aid in developing writing skills comprising:
   a substantially planar surface,
   a plurality of three module staffs on said surface,
   each of said three module staffs including
   three contiguous colored bands connected along an interface characterized by the absence of a line to provide an upper, middle and lower writing zone, the middle one of said bands being colored differently from said upper and lower zones so as to be distinctive, and
   a non-colored area separating each of said three staff modules on said writing surface.

2. The writing surface of claim 1 including a non-colored area extending about the periphery of said surface.

3. The writing surface of claim 1 wherein said substantially planar surface is a sheet of paper.

4. The writing surface of claim 3 wherein said upper, middle and lower zones are formed from bands of non-photographically reproducible ink.

5. The writing surface of claim 3 wherein said sheets of paper are adhesively connected along their top edges to form a tablet.

6. The writing surface of claim 1 wherein the width of each of said bands forming said upper, middle and lower zone of each said three module staffs are substantially of equal width.

7. The writing surface of claim 1 wherein the top and bottom bands are the same shade of a color and the middle band is a darker shade of the same color.

* * * * *